(12) United States Patent
Häβler et al.

(10) Patent No.: US 12,018,729 B2
(45) Date of Patent: Jun. 25, 2024

(54) TORSIONAL VIBRATION DAMPER WITH A ROTATIONAL AXIS FOR A POWERTRAIN

(71) Applicant: Schaeffler Technologies AG & Co. KG, Herzogenaurach (DE)

(72) Inventors: Martin Häβler, Graben-Neudorf (DE); Alain Rusch, Gambsheim (FR); Laurent Theriot, Strasbourg (FR); Michael Kessler, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 411 days.

(21) Appl. No.: 17/429,969

(22) PCT Filed: Dec. 5, 2019

(86) PCT No.: PCT/DE2019/101044
§ 371 (c)(1),
(2) Date: Aug. 11, 2021

(87) PCT Pub. No.: WO2020/173513
PCT Pub. Date: Sep. 3, 2020

(65) Prior Publication Data
US 2022/0145960 A1    May 12, 2022

(30) Foreign Application Priority Data

Feb. 27, 2019 (DE) .................. 10 2019 105 011.1
Aug. 6, 2019 (DE) .................. 10 2019 121 205.7

(51) Int. Cl.
*F16F 15/121*    (2006.01)

(52) U.S. Cl.
CPC ...... *F16F 15/1213* (2013.01); *F16F 15/1216* (2013.01); *F16F 2230/0064* (2013.01)

(58) Field of Classification Search
CPC ............... F16F 15/1213; F16F 15/1216; F16F 2230/0064
(Continued)

(56) References Cited

U.S. PATENT DOCUMENTS 799,388 A * 9/1905 Keyes ..................... F03D 15/20
858,412 A * 7/1907 Neate ....................... B60C 7/16
(Continued)

FOREIGN PATENT DOCUMENTS

| CN | 104736883 A | 6/2015 |
| CN | 108691952 A | 10/2018 |

(Continued)

*Primary Examiner* — Greg Binda

(57) ABSTRACT

A torsional vibration damper includes an input side and an output side, first and second rolling bodies, an intermediate element for torque transmission between the input and output sides, and an energy storage element for supporting the intermediate element in an oscillating manner. The intermediate element has a first transmission path for rolling the first rolling body, and a second transmission path for rolling the second rolling body. The input side has a first counter path complementary to the first transmission path. The output side has a second counter path complementary to the second transmission path. The first rolling body is guided between the first transmission path and the first counter path, and the second rolling body is guided between the second transmission path and the second counter path. The energy storage element is arranged with a vector component that acts circumferentially on the intermediate element in a circumferential direction.

5 Claims, 3 Drawing Sheets

(58) Field of Classification Search
USPC .................. 464/66.1, 68.92, 139; 192/205
See application file for complete search history.

(56) References Cited

U.S. PATENT DOCUMENTS

| | | | | |
|---|---|---|---|---|
| 1,641,385 | A | * | 9/1927 | Hufferd ................. F16D 3/62 |
| 2,089,397 | A | * | 8/1937 | Meyfarth ............... F16D 3/66 |
| 4,530,673 | A | * | 7/1985 | Lamarche ......... F16F 15/12346 |
| 11,015,677 | B2 | * | 5/2021 | Häβler ............. F16F 15/1435 |
| 2020/0124107 | A1 | | 4/2020 | Haessler et al. |
| 2021/0108702 | A1 | | 4/2021 | Ahnert |

FOREIGN PATENT DOCUMENTS

| | | |
|---|---|---|
| DE | 102015206940 A1 | 10/2016 |
| DE | 102015211899 A1 | 12/2016 |
| EP | 2508771 A1 | 10/2012 |
| FR | 3057321 A1 | 4/2018 |
| FR | 3057323 A1 | 10/2018 |
| JP | 2002089626 A | 3/2002 |
| JP | 2013545052 A | 12/2013 |
| JP | 2017125540 A | 7/2017 |
| JP | 2020516829 A | 6/2020 |
| JP | 2022521627 A | 4/2022 |
| WO | 2012075981 A1 | 6/2012 |
| WO | 2016073696 A1 | 5/2016 |
| WO | 2018215018 A1 | 11/2018 |

* cited by examiner

TORSIONAL VIBRATION DAMPER WITH A ROTATIONAL AXIS FOR A POWERTRAIN

CROSS-REFERENCE TO RELATED APPLICATIONS

This application is the United States National Phase of PCT Appln. No. PCT/DE2019/101044 filed Dec. 5, 2019, which claims priority to German Application Nos. DE102019105011.1 filed Feb. 27, 2019 and DE102019121205.7 filed Aug. 6, 2019, the entire disclosures of which are incorporated by reference herein.

TECHNICAL FIELD

The present disclosure relates to a torsional vibration damper with a rotational axis for a powertrain.

BACKGROUND

Such torsional vibration dampers of a variety of different types are already known from the background of the art. For example, from EP 2 508 771 A1 a torsional vibration damper is known in which an output side is provided with a (double) cam which acts on a lever-like intermediate element, the intermediate element being tiltably connected to a disk on an input side. The intermediate element is pretensioned against the cam on the output side by means of a compression spring and is deflected against the compression spring when the cam geometry is overrun. The compression spring is connected to the input side opposite the intermediate element in a pressure-transmitting manner, and thus a torque is passed via the compression spring from the input side to the output side.

Another variant of a torsional vibration damper is known from FR 3 057 321 A1, in which a lever-like spring body in the form of a (free-form) solid body spring is provided on an output side, this spring body having a ramp-like transmission path radially on the outside, which is connected in a torque-transmitting manner to a roller rolling on this transmission path. The roller is rotatably mounted on a bolt. If a torsional vibration occurs, a relative movement is brought about between the spring element and the corresponding roller, and due to the ramp-like transmission path, the spring body is deflected in its rotational relative movement to the roller by the roller against its spring force in a lever-like manner. This dampens torsional vibration.

Both the levers from EP 2 508 771 A1 and the spring bodies from FR 3 057 323 A1 are technically difficult to control and/or expensive to manufacture or assemble if low dissipation, i.e. high efficiency is desired.

For example, from WO 2018/215018 A1, a torsional vibration damper is known in which two intermediate elements are provided, which are mounted between an output side and an input side via rolling bodies. The rolling bodies run on complementary transmission paths in such a way that the intermediate elements are subject to a constraining guide. The two intermediate elements are pretensioned against each other by means of energy storage elements, so that the functional rigidity of the energy storage elements can be designed independently of a torque transmission.

For many applications, it is necessary on the one hand to reduce the natural frequency of a torque-transmitting system and at the same time to be able to transmit a high torque. It follows from the first requirement that the functional rigidity must be low. It follows from the second requirement that the rigidity of the energy storage elements must be high. These conflicting requirements can be solved by means of the rolling bodies and the transmission paths. A torque is only transmitted between the input side and the output side by means of the transmission paths and the rolling bodies arranged between them.

The functionally effective rigidity, which changes the natural frequency, is translated into a small spring deflection due to the low gradient and the large angle of rotation. This cam mechanism results in an (arbitrarily) low, functionally effective rigidity. This system has the advantage that the energy storage elements can be designed independently of the (maximum) transmittable torque. However, the embodiment shown, with a large number of separate rolling bodies and the high demands placed on the complementary transmission paths, is complex and expensive to manufacture and assemble. This means that this system is not competitive in all areas.

SUMMARY

In the following, if the axial direction, radial direction or the circumferential direction and corresponding terms are used without explicitly indicating otherwise, reference is made to a rotational axis. Unless explicitly stated otherwise, ordinal numbers used in the description only serve to clearly distinguish them and do not reflect the order or order of the components described. An ordinal number greater than one does not necessarily mean that another such component must be present.

The present disclosure relates to a torsional vibration damper having a rotational axis for a powertrain, including: an input side for receiving a torque; an output side for outputting a torque; at least one intermediate element in a torque-transmitting connection between the input side and the output side; for each intermediate element, a first rolling body and a second rolling body, the at least one intermediate element having a first transmission path for rolling the first rolling body and a second transmission path for rolling the second rolling body, the input side having a first counter path that is complementary to the first transmission path and the output side having a second counter path which is complementary to the second transmission path, the first rolling body being guided in a rollable manner between the first transmission path and the first counter path, and the second rolling body being guided in a rolling manner between the second transmission path and the second counter path; and at least one energy storage element, by means of which the intermediate element assigned to the energy storage element is supported such that it can oscillate.

The energy storage element may be arranged with a vector component acting in the circumferential direction on the assigned intermediate element.

The torsional vibration damper proposed here possesses a small number of separate components and only a small number of rolling bodies and complementary transmission paths, which are referred to here as the transmission path between the elements and as the (complementary) counter path on the input or output side. The input side is set up here to receive a torque, whereby it is not excluded here that the input side is also set up to output a torque. For example, the input side forms the torque input in a main state, for example in a powertrain of a motor vehicle with a so-called traction torque, i.e. a torque output from a drive engine, for example an internal combustion engine and/or an electric machine, via a gear train to vehicle wheels for propulsion of the motor vehicle. The output side is set up accordingly to output a torque, wherein the output side is also preferably set up to receive a torque. The output side thus forms, for example, in the application in a drive train of a motor vehicle in a secondary state, the input side for a so-called thrust torque, i.e. when the inertial energy of the moving motor vehicle during engine braking or during recuperation (recovery of electrical energy from the deceleration of the motor vehicle) forms the input torque.

In order to avoid transmitting a torsional vibration directly from the input side to the output side or vice-versa, at least one intermediate element is provided, e.g., at least two intermediate elements. The at least one intermediate element is arranged in a torque-transmitting connection between the input side and the output side. Here, the at least one intermediate element can be moved relative to the input side and relative to the output side, so that a torsional vibration can be induced in the intermediate element and thus on the energy storage elements with a predetermined (functionally effective) rigidity. The natural frequency, a function of the mass and the rigidity, of the system in which the torsional vibration damper is integrated can thus be changed, preferably reduced.

The intermediate element is supported on itself or on an adjacent intermediate element by means of at least one energy storage element, for example an arc spring, a leaf spring, a gas pressure accumulator or the like. The energy storage element is supported in a force-transmitting or torque-transmitting manner on a corresponding, e.g., single-piece, connecting device of the assigned intermediate element. For example, the connecting device is a contact surface and/or a riveting point.

The at least one intermediate element is supported on the input side and on the output side by means of the rolling bodies connected in series. For one of the rolling bodies, the intermediate element has one transmission path and one complementary counter path each for the same (assigned) rolling body on the input side and on the output side. The complementary counter path is formed by the output side or the input side, e.g., in one piece in each case with the input side and the output side. A torque is transmitted via the counter path and transmission path. No torque is transmitted between the input side and the output side via the at least one energy storage element.

If, for example, a torque is introduced, for example from the input side, the rolling bodies on the transmission path and the complementary counter path are rolled (up) from a rest position in the corresponding direction on the ramp-like transmission path as a result of a torque gradient above the torsional vibration damper. Rolling up high is used here to designate the fact that work is being done. More precisely, because of the geometric relationship, an opposing force of the energy storage element is overcome. Rolling down means releasing stored energy from the energy storage element in the form of a force on the assigned intermediate element. Up and down do not necessarily correspond to one spatial direction, not even in a co-rotating coordinate system.

With this torque-related movement, the rolling bodies force the assigned intermediate element to move relative to the input side and the output side, and the energy storage element, which acts antagonistically, is tensioned accordingly. If there is a change in the applied torque and, as a result, a speed difference between the input side and the output side, such as in the case of torsional vibration, this is counteracted by the inertia of the other (torque-absorbing) side, here the output side, and the rolling bodies roll back and forth (in a predetermined manner) on the transmission path as well as on the complementary counter path around the position corresponding to the applied torque. The rolling bodies thus counteract the energy storage element, which is tensioned as a function of a torque amount, so that a natural frequency is changed compared to a rest position or torque transmission without a torsional vibration damper (but with the same oscillating weight that is also moved).

The force is absorbed by the correspondingly designed energy storage element in the form of compression, expansion, torsion or other energy storage, and is passed on with a time delay, e.g., (almost) dissipation-free, to the respective other side, here for example the output side. The torque input, here for example the input side, including the torsional vibration, is thus changed over time, e.g., (almost) without loss, here for example to the output side. In addition, as explained above, the natural frequency is not constant, but rather depends on the torque gradient and thus on the applied torque as a result of the changeable position of the intermediate element.

In the reverse case of the introduction of a torque input via the output side for output to the input side, the rolling bodies are accordingly rolled in the other direction on the transmission path (up) (as opposed to the above description of the introduction of a torque via the input side). This movement of the rolling bodies causes a load on the energy storage element in the other direction or, in the case of a paired arrangement, a relief on the, e.g. first, energy storage element loaded according to the above example, and a load on the respective other, e.g. second, energy storage element. With a mutual support of two or more intermediate elements by means of one (common) energy storage element each in a circular arrangement, all energy storage elements are tensioned, for example in the manner of a screw clamp, by means of a radial inward displacement of the energy storage elements.

When the torque changes, as occurs with torsional vibration, the at least one energy storage element is deflected around the position corresponding to the applied torque and the stored energy in the form of a changed, i.e. time-delayed movement, in interaction with the rolling bodies between the respective transmission path and complementary counter path, here on the output side. This changes the natural frequency of the torque-transmitting system into which the torsional vibration damper is integrated.

In one embodiment, two or more intermediate elements are provided, which may be arranged rotationally symmetrical to the rotational axis, so that the torsional vibration damper is balanced with simple means. For a small number of components and (transmission) paths, an embodiment with exactly two intermediate elements may be employed.

Two energy storage elements may be provided to act on a (single) intermediate element, the energy storage elements being arranged antagonistically to each other and may be balanced with each other in accordance with the embodiment of the transmission paths and complementary counter paths. In an alternative embodiment, at least one constraining guide is provided, by means of which a movement is imposed geometrically guided at least on one of the intermediate elements, for example in the manner of a rail or groove and an encompassing pin or spring engaging in it.

According to this proposal (unlike embodiments of the following proposal below), the energy storage elements act on the assigned intermediate element with a direction of force with a vector component in the circumferential direction. The circumferential direction is defined on a circle concentric to the rotational axis. In one embodiment, the circumferential direction is constantly oriented via a movement of the assigned intermediate element, moving on a constant circle or oriented constantly or moving on a changing circle. The circle is at least large enough to touch the intermediate element, e.g., large enough so that the circle intersects a contact point or contact surface at which point the forces are transmitted between the energy storage element in question and the associated intermediate element. One circumferential direction is aligned perpendicular to a radius with the rotational axis as the center.

The respective underlying radius intersects the contact point or the contact area of the energy storage element and the intermediate element. This results in a direction of force on the intermediate element with a large vector component in the circumferential direction, e.g., with a vector component in the circumferential direction which is larger than the vector component in the radial direction. This means that the force on the intermediate element is not purely radially oriented, but is exclusively (at the contact point) tangential to the circumferential direction or with a radial vector component and with a (at the point of contact) tangential vector component. This results in a direction of force which can be transferred into the same intermediate element (from the other side), for example by means of a helical arc spring, or into the adjacent intermediate element approximately along the circumferential direction.

This enables, for example, a deflection additionally or exclusively in the circumferential direction instead of a deflection (or oscillation) of the energy storage element exclusively in the (radial) transverse direction. In an example embodiment, the intermediate element is supported in an inadequately defined manner via the rolling bodies, for example only supported in a radially defined manner, and the at least one energy storage element defines the movement as a result of the force introduction direction, for example exclusively in the circumferential direction. Alternatively, an additional guide is provided for the intermediate element.

According to a further aspect, a torsional vibration damper having a rotational axis is proposed for a powertrain, having at least the following components: an input side for receiving a torque; an output side for outputting a torque; at least two intermediate elements in a torque-transmitting connection between the input side and the output side; and for each intermediate element, a first rolling body and a second rolling body. The intermediate elements each have a first transmission path for rolling the first rolling body and a second transmission path for rolling the second rolling body, the input side has a first counter path that is complementary to the first transmission path and the output side has a second counter path that is complementary to the second transmission path. The first rolling body is guided in a rollable manner between the first transmission path and the first counter path, and the second rolling body is guided in a rolling manner between the second transmission path and the second counter path.

The torsional vibration damper also includes a number of energy storage elements corresponding to the number of intermediate elements, by means of which the intermediate element assigned to the energy storage element is supported in an oscillating manner, and each of the intermediate elements is supported on the at least one adjacent intermediate element respectively by means of the assigned energy storage elements. For each intermediate element, only the first rolling body and the second rolling body are provided as rollable bodies.

Reference is made to the previous explanation of the underlying principle, as well as to the definitions and relationships between the input side, the output side, a respective intermediate element and assigned energy element, as well as the rolling bodies with the assigned transmission paths and counter paths. In contrast to the previous description, at least two intermediate elements and at least one, e.g., two, energy storage elements are provided here, and the intermediate elements are supported on each another in a force-transmitting manner by means of the at least one energy storage element.

According to this proposal (in contrast to embodiments of the proposal described above), the at least one energy storage element is in all cases supported in an insufficiently defined manner via the rolling bodies, for example exclusively defined radially, whereby only two rolling bodies are provided for each intermediate element, i.e. a single (for example first) rolling body to the input side and a single (for example second) rolling body to the output side. The at least one energy storage element, which acts on an intermediate element and which is supported on the at least one (directly) adjacent intermediate element, defines the movement as a result of the direction of force introduction, for example exclusively in the circumferential direction. For a safe configuration, a constraining guide is additionally provided, for example, by means of which the movement of the respective intermediate element is (geometrically) over-defined.

It is further proposed that the torsional vibration damper have the features of the above embodiments.

In this embodiment, a respective intermediate element of the plurality of intermediate elements is therefore supported by means of only two rolling bodies, i.e. supported in an under-determined manner or only just supported, provided that the force to secure the position of the transmission path to the complementary counter path and the rolling body rolling in between, as well as the intentionally created degree of freedom on the transmission path, for example executed as an indifferent equilibrium position, remains unconsidered. During operation, for example, this force is supported by the inertial reaction to the centripetal force (centrifugal force). The intentionally created degree of freedom of the transmission path, for example as an indifferent equilibrium, is recorded in a defined manner by the two energy storage elements.

For example, a rolling body rolling on the transmission path (and complementary counter path) leads to a movement with a radial and/or tangential vector component. As a result, a distance is traveled which is stored as a potential in at least one of the assigned energy storage elements. Furthermore, the necessary force, e.g. the exclusively radially acting force, may be applied by the energy storage elements in order to hold the counter path and the transmission path against each other in such a way that the assigned rolling body can only be moved between them by rolling. A movement of a rolling body thus always induces a relative movement between the counter path and the complementary transmission path and thus between the intermediate element and the input side and the output side. A support in the radial direction and/or a constraining guide for the intermediate element, for example by means of a larger number of rolling bodies, is not necessary.

It is also proposed in an example embodiment of the torsional vibration damper that exactly three intermediate elements and exactly three energy storage elements are provided. The first intermediate element and the second intermediate element are supported on each other by means of the first energy storage element, the second intermediate element and the third intermediate element are supported on each other by means of the second energy storage element, and the first intermediate element and the third intermediate element are supported on each another by means of the third energy storage element.

In this embodiment, on the one hand, the number of intermediate elements, transmission paths, counter paths, rolling bodies and energy storage element is still low, while on the other, the effort in terms of manufacturing tolerances on the transmission paths and mating paths is reduced compared to a constraining guide with more than two rolling bodies per intermediate element. In this embodiment, a manufacturing-related deviation from the ideal alignment of the intermediate element in the rest position can be tolerated to a greater extent and/or compensated by the energy storage elements during an adjustment process within a framework according to the design, such as predetermined by the geometric conditions.

It is further proposed in an example embodiment of the torsional vibration damper that the at least one intermediate element is supported solely by means of the at least one assigned energy storage element and by means of the rolling bodies.

In this embodiment, the intermediate element is brought into stable equilibrium without additional (compulsory) guide elements solely by means of the transmission paths, the complementary counter paths and the respective rolling bodies in interaction with the assigned energy storage elements. Here, a stable equilibrium means that it cannot be moved out of a target position, at least from a torque deflection and torque oscillations according to the design. At least for mobile applications, the equilibrium is so stable that even with (designed) transverse forces, such as vibrations, this arrangement cannot be moved out of a desired position, for example the rolling body cannot be lifted off one of its paths. The vector component of the force of the energy storage elements in the radial direction or perpendicular to (the adjacent section of) the transmission path and counter path is always greater than a lifting (external) force.

This is ensured if the directions of force of the introduced forces, i.e. the alignment of the force vector along or parallel to an action line, of the energy storage elements are independent of the deflection of the intermediate element in the moment balance point of the intermediate element with those action lines of the resulting (counter) forces above the rolling bodies intersects, which runs through the rolling center (rolling axis) of the rolling body and is aligned perpendicular to the transmission path and to the complementary counter path. Thus, there is a moment equilibrium at the intermediate element around the moment balance point of the intermediate element. It follows intrinsically from this that the force component of the force vectors conducted via the rolling bodies corresponds to the forces or the force components of the energy storage elements acting on the intermediate element. This means that if the force of the energy storage elements is increased, the resulting force via the rolling bodies also increases with this design rule. The force vectors in the case of two antagonistic energy storage elements thus form a (closed) polygon of forces, i.e. the force sum zero according to vector addition rules.

It is also proposed in an example embodiment of the torsional vibration damper that the two rolling bodies are arranged radially spaced from each other.

In this embodiment, little space is required in the circumferential direction, so that, for example, the intermediate elements can be made narrow in the circumferential direction and thus more space for the energy storage elements and thus, for example, a large angle of rotation, and thus a low, functionally effective rigidity with a simultaneous high rigidity of the at least one energy storage element.

It is also proposed in an example embodiment of the torsional vibration damper that the two rolling bodies are arranged at a distance from each other in the circumferential direction.

In this embodiment, a small amount of radial installation space required, so that, for example, the intermediate elements can be arranged on a large circumferential circle and thus, for example, a large angle of rotation and thus a low, functionally effective rigidity with high rigidity of the at least one energy storage element can be set. Alternatively or additionally, a torque can be transmitted over the same transmission paths and thus with the same amount.

It is also proposed in an example embodiment of the torsional vibration damper that the two rolling bodies are arranged radially and spaced from each other in the circumferential direction.

In this embodiment, the features of the above-mentioned embodiment can be combined with each other or can be approximated to an ideal with small deviations in each case.

It is further proposed in an example embodiment of the torsional vibration damper that the transmission paths and the respective complementary counter paths each include a traction torque pairing with a first transmission curve and a thrust torque pairing with a second transmission curve. The traction torque pairing is set up for torque transmission from the input side to the output side, the thrust torque pairing is set up for torque transmission from the output side to the input side, and the first transmission curve and the second transmission curve have different transmission curves from each other, at least in certain areas.

In general, a traction torque and a thrust torque do not differ in a theoretical application. The terms are therefore to be seen neutrally and only serve to make it easy to distinguish the designated torque transmission direction. These terms are taken from the usual designations in a powertrain of a motor vehicle, but can be transferred accordingly for other applications. The traction torque pairing is applied in a traction torque transmission, for example from the input side to the output side, with the rolling body rolling (up) on the traction torque pairing against the force of the antagonistic energy storage element with increasing torque. In this way, the potential of this antagonistic energy storage element is increased, for example tensioned, and thus the rigidity is changed. Torsional vibrations therefore counteract a greater force of the antagonistic energy storage element as the torque increases, and the natural frequency is thus changed. This applies accordingly to the thrust torque pairing, the rolling body being forced to roll (up) on the thrust torque pairing as a result of the load on the energy storage element.

In this embodiment, the first transmission curve and the second transmission curve, which each start from a common point of the rest position, are provided with different transmission progressions. The rigidity properties of the torsional vibration damper can therefore be individually set up (differently) for a traction torque and a thrust torque.

In one embodiment, for example, a low rigidity is required for the transmission of a traction torque, which can be achieved over a larger angle of rotation (a lower reduction ratio, i.e. a smaller denominator of the transmission ratio) than is desired for a thrust torque (a larger reduction ratio). Furthermore, for example, a progressive or degressive rigidity curve is desired, or even a multiple-variable rigidity curve is desired. For example, there is a slight increase in rigidity for the region close to idling, for a main load torque there is a steep increase in rigidity, which again decreases increasingly degressively, and a progressive increase in rigidity is again established up to a maximum transfer of a transmittable torque.

Here, the transmission path and the complementary counter path are to be designed in accordance with the respective deflection position of the intermediate element, so that the transmission curve is to be executed superimposed with the movement of the intermediate element. The transmission path and the complementary counter path may be designed for a moment equilibrium in accordance with the above description, so that no additional guide device is necessary for the intermediate element, for example.

It is also proposed in an example embodiment of the torsional vibration damper that the at least one intermediate element is pretensioned by means of two antagonistic energy storage elements.

In this embodiment, a pre-tensioning of the energy storage elements can be reliably and easily adjusted via the intermediate element or the intermediate elements against the rolling bodies. For example, with structurally identical energy storage elements, the dependency on component tolerances, for example the spring characteristic of an energy storage element, is low in that the tolerances mutually decrease, for example a rigidity deviating downwards from the target rigidity of the first energy storage element is compensated for by the upwardly deviating rigidity of the second energy storage element or reduced. With the same direction of deviation, the preload is indeed reduced or increased overall compared to the target preload, but nevertheless balanced as a result of the antagonistic effect, for example on both sides of the intermediate element.

In one embodiment, only the rest position of the intermediate element is changed. The tolerance may be so small that the rest position remains within a predetermined tolerance range. In an embodiment with three intermediate elements, the (three) energy storage elements are connected to each other in such a way that the first (or second) energy storage element of the first intermediate element is also in antagonistic operative connection with the second (or first) energy storage element of the second intermediate element and a compensating effect on the component tolerance of the energy storage elements is achieved. Overall, the required manufacturing accuracy, the assembly effort or the adjustment effort and/or the costs for standard components are reduced due to a lower component quality.

It is also proposed in an example embodiment of the torsional vibration damper that the first energy storage element exerts a first force and a first direction of force on the assigned intermediate element and the second energy storage element exerts a second force and a second direction of force on the assigned intermediate element. The first force and the second force differ from each other and/or the first direction of force and the second direction of force differ from each other in a rest position.

It should be pointed out that the energy storage elements do not tilt about a radial axis or that such tilting is not conducive to influencing the natural frequency. The direction of force described here is thus defined as a vector which lies in the plane of rotation to which the rotational axis is oriented normally. Furthermore, it should be noted that the direction of force of the two antagonistic energy stores is not the same, as long as they are considered in a global, i.e. common, coordinate system. Here, the direction of force is meant in comparison to the mirroring of the other direction of force, namely the mirroring on an axis of rest or center line (in the rest position) of the intermediate element and possibly the force side, which then deviates from the other direction of force. The center line of the intermediate element is not related to the geometric or mass-related center, but to the acting forces.

The force here refers only to the magnitude of a force vector, whereby the force vector can therefore be broken down into the force (magnitude) and the direction of the force (effective direction).

It should also be pointed out that the forces and directions of force of the two antagonistic energy storage elements differ from each other in a symmetrical design in a deflected state of the intermediate element and in a non-symmetrical design, as proposed here, can be the same in a deflected state.

In this embodiment, a different torque characteristic curve is set up for a traction torque transmission and a thrust torque transmission in the opposite direction, so that the influencing of the natural frequency by means of the torsional vibration damper is different depending on the direction of the torque. In this case, the intermediate element may be brought into equilibrium, as described above, by means of a corresponding transmission path.

In one embodiment, the two antagonistic energy storage elements used are the same (in the non-installed, i.e. relaxed state). Here, the different force is set up, for example, by means of the form of the traction torque pairing and the thrust torque pairing of the transmission path deviating from each other (compare the description above). In another variant, the different force is established by means of an installation distance of different length between the force side and the intermediate element.

The different direction of force is achieved, for example, by a different inclination of the contact surfaces on the intermediate element and/or on the force side for the two antagonistic energy storage elements. In one embodiment, the direction of force is variable via a deflection of the intermediate element, in that at least one of the two antagonistic energy storage elements tilts about an axis parallel to the rotational axis. As a result of a different direction of force, with otherwise identical energy storage elements, the spring deflection, that is to say the energy absorption with (the same) deflection of the intermediate element, is different. In this installation situation, the rigidity of identical, antagonistic energy storage elements is therefore different. For improved costs and assembly effort or assembly reliability, the same energy storage elements may be used. In the above context, however, identical energy storage elements are only mentioned to clarify the relationship and the use of different directions of force is not restricted to such a case.

It is also proposed in an example embodiment of the torsional vibration damper that the at least one energy storage element is a helical compression spring with a straight spring axis.

A helical compression spring with a straight spring axis, also referred to as a (purely) cylindrical helical compression spring, is a widely used standard component whose elastic and (low) dissipative properties are well known and easy to control. Tolerances in the overall length or the spring characteristic to a predetermined installation length can be compensated for by simple means. In addition, such helical compression springs do not require any additional guidance, which would otherwise cause friction and thus have a reduced efficiency and/or a damping property that is more difficult to determine due to hysteresis effects. In addition, a helical compression spring enables a large variance in the spring characteristic, which can be adjusted, among other things, through the pitch of the windings, wire thickness, the ratio of the installation length to the relaxed length and the choice of material.

In addition, helical compression springs with a straight spring axis are unbreakable compared to other types of springs, for example steel springs, and in some embodiments can be loaded to the block, so that in the event of an overload on the torsional vibration damper in such an embodiment of the energy storage element that can be brought to block, no additional securing element has to be provided against breaking of the energy storage element. In addition, a helical compression spring has the advantage of a very long possible spring deflection with simultaneous high spring rigidity, so that on the one hand a large torque can be conducted via the at least one energy storage element and on the other, a suitable reduction in motion can be set up with the aid of the transmission path, so that a reduced amplitude of the torsional vibration compared to the amplitude of the torsional vibration movement of the intermediate element is achieved, and thus the torsional vibrations result in a small spring deflection of the helical compression spring. As a result, the helical compression spring counteracts the torsional vibration with a (suitably) low force despite its high rigidity.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, wherein it should be noted that the drawings are not dimensionally accurate and are not suitable for defining proportions. The figures show the following.

DETAILED DESCRIPTION

Figure 1:
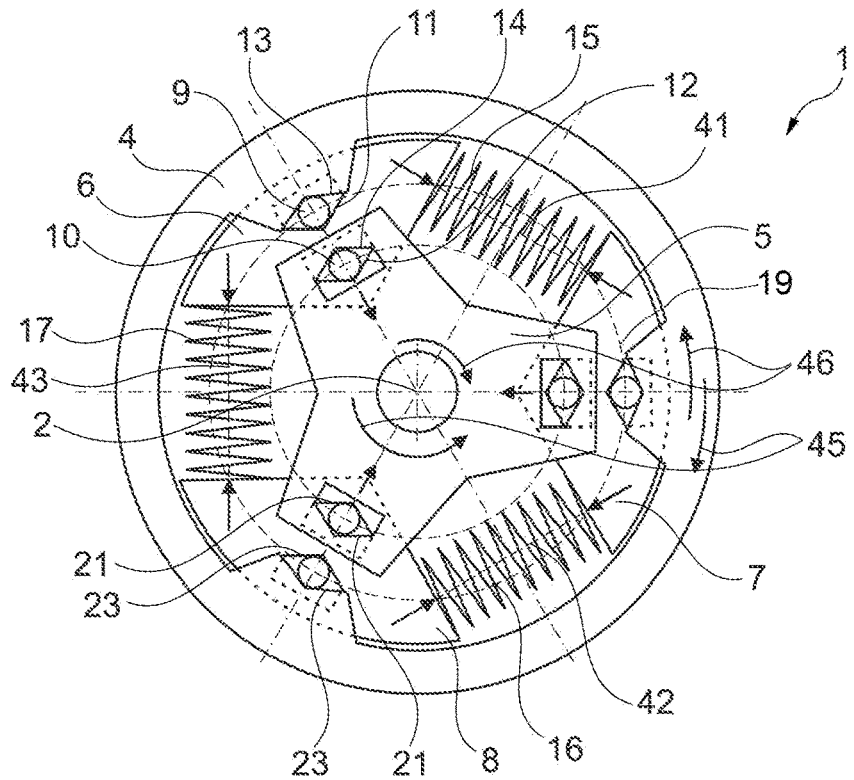
FIG. 1 shows a principle sketch of a torsional vibration damper in a first embodiment.
Figure 2:
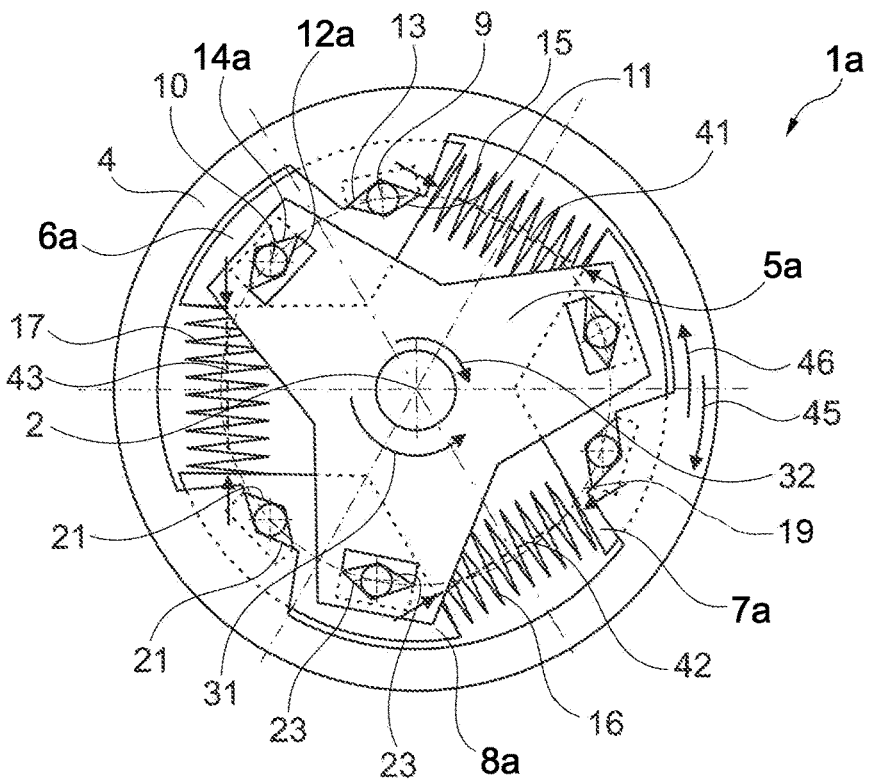
FIG. 2 shows a principle sketch of a torsional vibration damper in a second embodiment.

By way of example, FIG. 1 and FIG. 2 each show in a principle sketch different embodiments of a torsional vibration damper 1 and 1a, respectively, which for the sake of clarity are depicted largely in the same manner and insofar as the descriptions for the respective figures of the same components are cross-referenced. While the same description generally applies to both embodiments, reference numerals for damper 1a in FIG. 2 that differ from those for damper 1 in FIG. 1 are shown in parentheses. Here, an annular disk forms an input side 4. In the center of the common rotational axis 2, a further disk element is designed, for example, as an output side 5, or 5a in FIG. 2. Alternatively, the annular disk is the output side 5 (5a) and the disk element is the input side 4. The variant mentioned above is described below, wherein the terms are interchangeable.

As indicated by the arrows, a traction torque 45 can be transmitted from the input side 4 to the output side 5 (5a) and a thrust torque 46 can be transmitted from the output side 5 (5a) to the input side 4. In one embodiment, the torque direction is set up in reverse.

In FIG. 1, interposed between the input side 4 and the output side 5, are three intermediate elements 6, 7, 8. Similarly, in FIG. 2, intermediate elements 6a, 7a and 8a are interposed between the input side 4 and the output side 5a. The respective intermediate element 6, 7, 8 (6a, 7a, 8a) of paired energy storage elements 15, 16, 17 is connected in a force-transmitting manner to the respective adjacent intermediate element 6, 7, 8 (6a, 7a, 8a). The respective intermediate element 6, 7, 8 (6a, 7a, 8a) is supported on the input side 4 by means of a first rolling body 9 and the respective intermediate element 6, 7, 8 (6a, 7a, 8a) is supported on the output side 5 (5a) by means of a second rolling body 10. The first rolling body 9 is supported in a rolling manner on a first transmission path 11 on the intermediate element side and a first complementary counter path 13 on the input side 4 in a force-transmitting and thus torque-transmitting manner. The second rolling body 10 is supported in a rolling manner on a second transmission path 12 (12a) on an intermediate element side and a second complementary counter path 14 (14a) on the output side 5 (5a) in a force-transmitting and thus torque-transmitting manner. The rolling bodies 9, 10 are here pretensioned by means of the energy storage elements 15, 16, 17 against the transmission path 11, 12 (12a) and against the counter path 13, 14 (14a) and are thus guided on them in a rollable manner. The energy storage elements 15, 16, 17 hold the intermediate element 6, 7, 8 (6a, 7a, 8a) acting antagonistically to each other in a rest position in the position shown.

On the third intermediate element 8 (8a) in the first rolling body 9 and the second rolling body 10 (according to the designation for the first intermediate element 6 (6a)) it is shown (for the sake of clarity pars-pro-toto) that to the side of the rest position, a traction torque pairing 21 is formed from the respective complementary ramp portion of the transmission path 11, 12 (12a) and the counter path 13, 14 (14a), and a thrust torque pairing 23 is formed on the respective other side from the complementary ramp portions of the transmission path 11, 12 (12a) and the counter path 13, 14 (14a). Again, solely for the sake of clarity, the traction torque pairing 21 is shown pars-pro-toto only on the first rolling body 9 and, accordingly, the thrust torque pairing 23 is shown only on the second rolling body 10. However, these pairings are formed respectively on each of the rolling bodies 9, 10 by the transmission path 11, 12 (12a) on the intermediate element side and the complementary counter path 13, 14 (14a). Their mode of action is explained in detail below. In the embodiments shown, the intermediate elements 6, 7, 8 (6a, 7a, 8a) are supported solely via the respective rolling bodies 9, 10 on the input side 4 and on the output side 5 (5a), and the intermediate elements 6, 7, 8 (6a, 7a, 8a) are supported among each other by means of the energy storage elements 15, 16, 17. The energy storage elements may be helical compression springs with a straight spring axis, for example. An additional guide may not be provided.

In FIG. 1, the first rolling body 9 and the second rolling body 10 of a respective intermediate element 6, 7, 8 are arranged radially spaced apart from each other and are in the rest position on a common radius. In the rest position, therefore, they are not spaced apart in the circumferential direction 19. FIG. 2 shows an alternative embodiment with regard to the arrangement of the two rolling bodies 9, 10 of a respective intermediate element 6a, 7a, 8a with respect to each other, wherein the two rolling bodies 9, 10 are not radially spaced apart, but are spaced apart from each other in the circumferential direction 19. In the embodiments shown, for the sake of better comparability, the energy storage elements 15, 16, 17 are designed and arranged identically.

Figure 3:
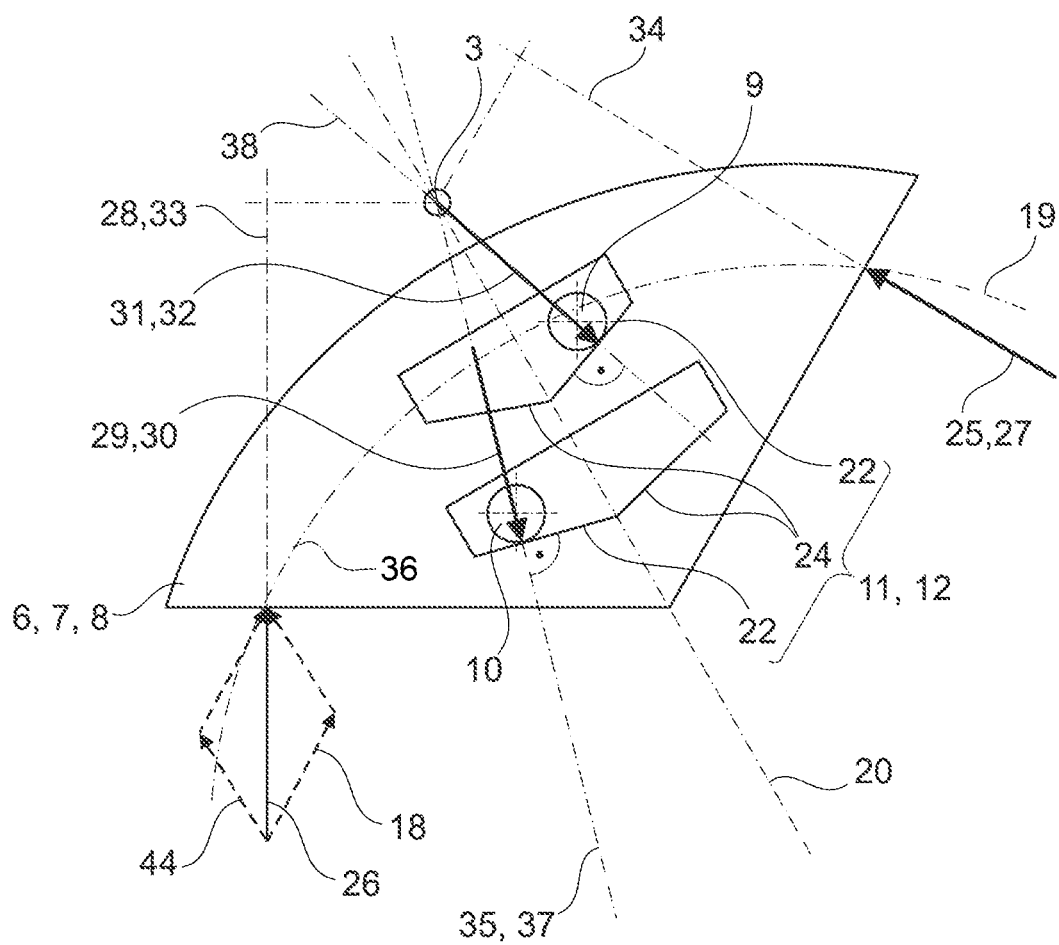
FIG. 3 shows a diagram of the forces applied to an intermediate element.
Figure 4:
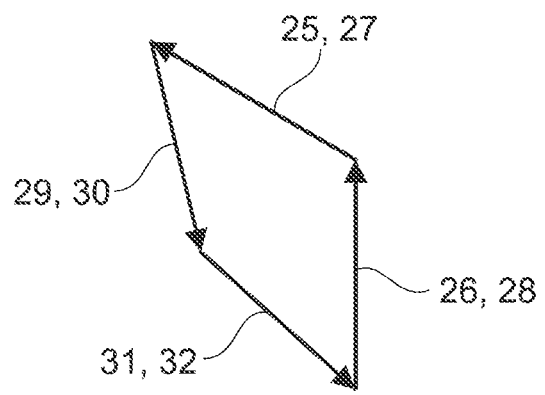
FIG. 4 shows a polygon of forces of the applied forces according to FIG. 3.

FIG. 3 shows a diagram of the moment equilibrium and FIG. 4 shows a polygon of forces over the first intermediate element 6, the second intermediate element 7 or the third intermediate element 8 with a first rolling body 9 and the second rolling body 10 according to the embodiment in FIG. 1. Here, the intermediate element 6, 7, 8 is led out of its rest position and is deflected at an angle of deflection to the rest position inclined to the rest line 35. The rest line 35 always runs through the moment balance point 3 of the intermediate element 6, 7, 8, but only in the rest position through the rolling axes of both rolling bodies 9, 10, but always through one of the two rolling axes (here the second rolling body 10). At this moment balance point 3 of the intermediate element 6, 7, 8, there must be a moment equilibrium if it is required that no additional (forced) guidance is provided for the intermediate element 6, 7, 8. The resulting directions of force 30, 32 over the rolling bodies 9, 10, i.e. the first pressure line 37 of the first rolling body 9 and the second pressure line 38 of the second rolling body 10, must always be aligned perpendicular to the adjacent (theoretically infinitesimal) section of the transmission path 11, 12 and run through moment balance point 3. To ensure that this rule is always adhered to, a parallel of the first action line 33 of the first force 25, starting from the first energy storage element 15, with a second parallel, which is at an equal distance or is spaced apart in proportion to the force, of the second action line 34 of the second force 26, intersect with the two pressure lines 37, 38 in the moment balance point 3, starting from the other (for example third) energy storage element 16, so that no (effective) lever arm arises.

For a suitable contact pressure of the rolling bodies 9, 10, the first force 25 and the second force 26 (shown here only on the second force 26) are divided into a tangential vector component 18 (functionally effective component) and a radial vector component 44 (contact pressure component for the rolling bodies 9, 10). The orientation of the tangential vector component 18 results from the tangent at the point of force application to the intermediate element 6, 7, 8 on the circumferential direction 19 on a radius of the circle 36 on which this point of force application lies. Furthermore, it is required that the first force 25, the second force 26 and the resulting forces 29, 31 form a self-canceling polygon of forces, as shown in FIG. 4. For this purpose, the first direction of force 27, the second direction of force 28 and the resulting directions of force 30, 32 of the two rolling bodies 9, 10 must be present as shown.

It follows from the position shown that both the first energy storage element 15 (see FIG. 1) and the second energy storage element 16 (see FIG. 1) are more strongly tensioned, as a result of which an increased pre-tensioning force acts on the intermediate element 6, 7, 8. In this embodiment, the stronger tensioning follows from a movement of the intermediate element 6, 7, 8 radially inward, so that the energy storage elements 15, 16, 17 are also moved radially inward and are compressed between the adjacent intermediate elements 6, 7, 8 like a screw clamp. The intermediate elements 6, 7, 8 are thus moved in such a way that the resulting distance along the spring axes 41, 42, 43 of the energy storage elements 15, 16, 17 between the intermediate elements 6, 7, 8 is shortened compared to the rest position, provided that there is increased rigidity a higher torque is desired (compare FIGS. 5 to 8). For the correct alignment of the pressure lines 37, 38, i.e. the action lines of the resulting forces 29, 31 on the rolling bodies 9, 10, it is necessary that the pressure lines 37, 38, which intersect the rolling axis of the assigned rolling body 9, 10 and the moment balance point 3 respectively, are always perpendicular to the transmission path 11, 12, here the first transmission curve 22, which is assigned to the traction torque 45. The respective amount of the resulting force 29, 31 and the resulting direction of force 30, 32 then result intrinsically from the applied first force 25 and second force 26.

In FIGS. 5 to 8, torque-rotation angle diagrams are shown in which the torque axis 39 forms the ordinate and the rotation angle axis 40 forms the abscissa. In this example, to the right of the ordinate is a traction torque curve with a positive torque and angle of rotation, and to the left of the ordinate is a thrust torque curve with a negative torque and angle of rotation.

Figure 5:
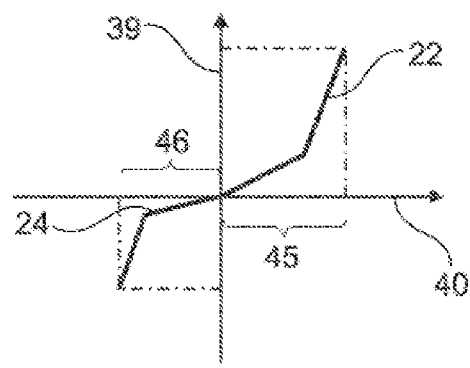
FIG. 5 shows a moment-angle of rotation diagram with a first transmission curve.

FIG. 5 shows a first transmission curve 22, then assigned to the traction torque pairing 21, and a second transmission curve 24, then assigned to the thrust torque pairing 23, in a two-part progressive form, so that at low torque amounts, there is a flat increase in the curve and at high torque amounts, there is a steep increase in the curve.

Figure 6:
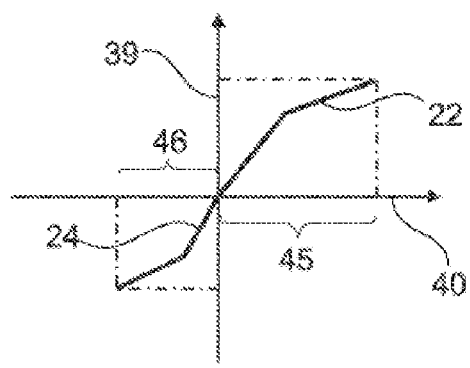
FIG. 6 shows a moment-angle of rotation diagram with a second transmission curve.

In FIG. 6, a two-part degressive variant is correspondingly shown, in which there is a steep curve increase at low torque levels and a flattened curve increase at high torque levels.

Figure 7:
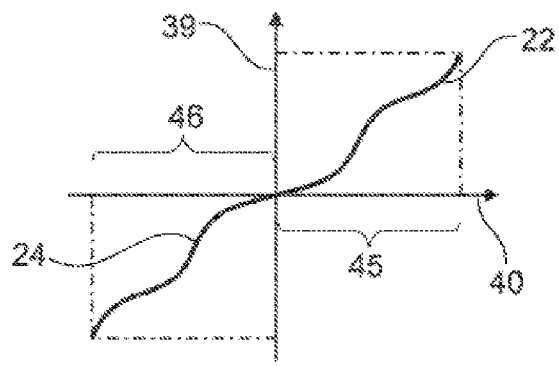
FIG. 7 shows a moment-angle of rotation diagram with a third transmission curve.
Figure 8:
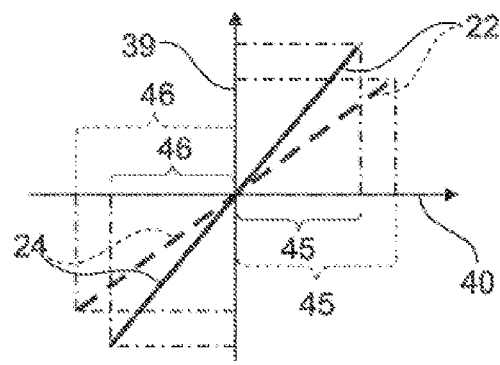
FIG. 8 shows a moment-angle of rotation diagram with a fourth and fifth transmission curve.

FIG. 7 shows a variant in which a progressive and degressive course alternate and in FIG. 8, a stiff system with a steep curve course with a solid line is shown in comparison with a system with a flat curve course shown with dashed line.

For the embodiment in FIGS. 1 and 2 without additional guidance of the intermediate element 6, 7, 8 (6a, 7a, 8a), such a transmission curve 22, 24 is to be observed in accordance with the equilibrium of moments and forces as explained in FIGS. 3 and 4. The illustrated transmission curve 22, 24 is therefore to be executed superimposed with the requirement for the transmission path 11, 12 (12a) according to the description of FIG. 1 (and FIG. 2). Furthermore, in one embodiment, the force 25 or the rigidity of the first energy storage element 15 is different from the second energy storage element 16 in the rest position and is not designed symmetrically as indicated in FIGS. 1 and 2. This must also be taken into account for the superimposition in order to achieve the desired transmission curve 22, 24.

With the torsional vibration damper proposed here, an inexpensive and efficient influencing of the natural frequency can be achieved with just a few components.

REFERENCE NUMERALS 1, 1a Torsional vibration damper
2 Rotational axis
3 Moment balance point
4 Input side
5, 5a Output side
6, 6a First intermediate element
7, 7a Second intermediate element
8, 8a Third intermediate element
9 First rolling body
10 Second rolling body 11 First transmission path
12, 12a Second transmission path
13 First counter path
14, 14a Second counter path
15 First energy storage element
16 Second energy storage element
17 Third energy storage element
18 Tangential vector component
19 Circumferential direction
20 Radial direction
21 Traction torque pairing
22 First transmission curve
23 Thrust torque pairing
24 Second transmission curve
25 First force
26 Second force
27 First direction of force
28 Second direction of force
29 First resulting force
30 First resulting direction of force
31 Second resulting force
32 Second resulting direction of force
33 First action line
34 Second action line
35 Rest line
36 Circle of the force application point
37 First pressure line
38 Second pressure line
39 Torque axis
40 Rotation angle axis
41 First spring axis
42 Second spring axis
43 Third spring axis
44 Radial vector component
45 Traction torque
46 Thrust torque

The invention claimed is:

1. A torsional vibration damper with a rotational axis for a powertrain of a motor vehicle, comprising:
an input side for receiving a torque;
an output side for outputting the torque;
a first rolling body;
a second rolling body;
a third rolling body;
a fourth rolling body;
a first intermediate element arranged for torque transmission between the input side and the output side; the first intermediate element comprising:
a first transmission path for rolling the first rolling body;
a second transmission path for rolling the second rolling body;
a second intermediate element arranged for torque transmission between the input side and the output side, the second intermediate element comprising:
a third transmission path for rolling the third rolling body;
a fourth transmission path for rolling the fourth rolling body; wherein:
the input side comprises:
a first counter path complementary to the first transmission path; and
a second counter path complementary to the third transmission path;
the output side comprises:
a third counter path complementary to the second transmission path; and
a fourth counter path complementary to the fourth transmission path;
the first rolling body is guided in a rolling manner between the first transmission path and the first counter path;
the second rolling body is guided in a rolling manner between the second transmission path and the third counter path;
the third rolling body is guided in a rolling manner between the third transmission path and the second counter path;
the fourth rolling body is guided in a rolling manner between the fourth transmission path and the fourth counter path;
a first energy storage element for supporting the first intermediate element and another intermediate element in an oscillating manner;
a second energy storage element for supporting the second intermediate element and another intermediate element in an oscillating manner;
the first rolling body and the second rolling body are the only rollable bodies for the first intermediate element; and
the third rolling body and the fourth rolling body are the only rollable bodies for the second intermediate element.

2. The torsional vibration damper of claim 1, further comprising:
a fifth rolling body;
a sixth rolling body;
a third intermediate element arranged for torque transmission between the input side and the output side, the third intermediate element comprising:
a fifth transmission path for rolling the fifth rolling body; and
a sixth transmission path for rolling the sixth rolling body; and
a third energy storage element for supporting the third intermediate element and another intermediate element in an oscillating manner, wherein:
the first intermediate element and the second intermediate element are supported on each other by means of the first energy storage element;
the second intermediate element and the third intermediate element are supported on each other by means of the second energy storage element; and
the first intermediate element and the third intermediate element are supported on each other by means of the third energy storage element.

3. The torsional vibration damper of claim 1, wherein the first intermediate element is mounted solely by means of the first energy storage element, the first rolling body, and the second rolling body.

4. The torsional vibration damper of claim 1, wherein the first rolling body and the second rolling body are arranged:
radially spaced apart from each other; or
spaced apart from each other in the circumferential direction.

5. The torsional vibration damper of claim 1, wherein the first energy storage element is a helical compression spring with a straight spring axis.

* * * * *